United States Patent [19]
Gläser et al.

[11] Patent Number: 6,152,468
[45] Date of Patent: Nov. 28, 2000

[54] COMPOSITE SUSPENSION CONTROL ARM SHAFT FOR MOTOR VEHICLES

[75] Inventors: Klaus Gläser, Salzkotten; Claus Mehren, Paderborn, both of Germany

[73] Assignee: Benteler AG, Paderborn, Germany

[21] Appl. No.: 09/190,427

[22] Filed: Nov. 12, 1998

[30] Foreign Application Priority Data

Nov. 14, 1997 [DE] Germany ........................ 297 20 207 U

[51] Int. Cl.⁷ .................................................. B60G 11/00
[52] U.S. Cl. ....................................................... 280/124.134
[58] Field of Search ..................... 280/124.134, 124.133, 280/124.131; 52/731.6; 29/897.2

[56] References Cited

U.S. PATENT DOCUMENTS 4,232,881 11/1980 Kolbel et al. ............................ 280/721

FOREIGN PATENT DOCUMENTS 2735939 2/1979 Germany .

*Primary Examiner*—Paul N. Dickson
*Assistant Examiner*—Faye M. Fleming
*Attorney, Agent, or Firm*—Friedrich Kueffner

[57] ABSTRACT

A composite suspension control arm shaft for motor vehicles includes two tubular longitudinal control arms connected through a torsion section having a V-shaped or U-shaped cross-section, wherein reinforcing sheet metal pieces are mounted in the transition areas between the torsion section and the longitudinal control arms for increasing the bending stiffness. The ends of the torsion section have a configuration which is adapted to the outer contour of the longitudinal control arms and the apex portions located at the ends extend to the upper sides of the longitudinal control arms, wherein the reinforcing sheet metal pieces are each welded with a leg thereof to the torsion section at the apex portion of the torsion section and with another leg to the length portion of the longitudinal control arm on the side of the wheel carrier, wherein the reinforcing sheet metal pieces are arranged so as to be inclined downwardly from the torsion section toward the end of the longitudinal control arm on the side of the wheel carrier, and wherein the reinforcing sheet metal pieces engage with end faces thereof around portions of a wheel carrier and are connected to the wheel carrier.

5 Claims, 1 Drawing Sheet

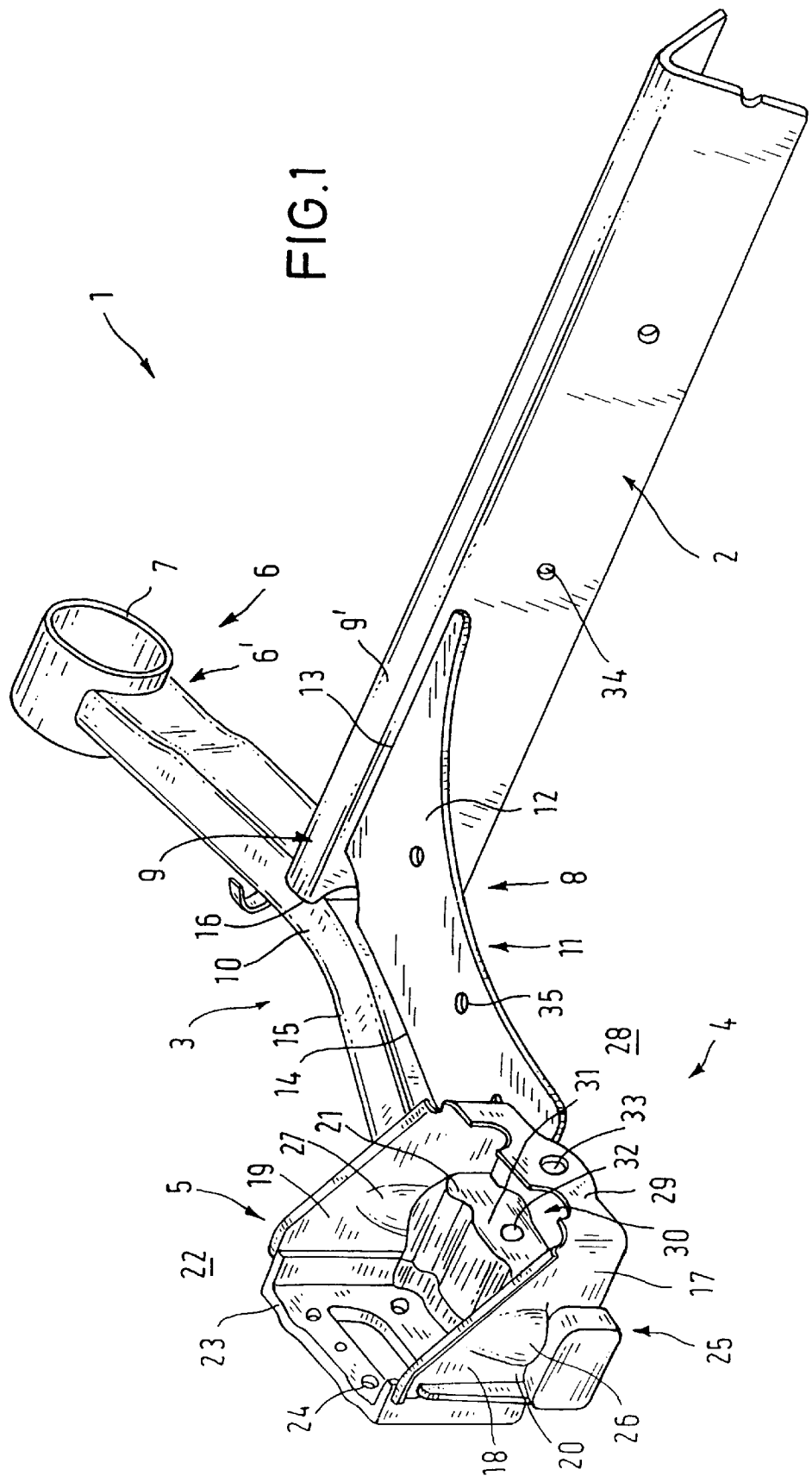

COMPOSITE SUSPENSION CONTROL ARM SHAFT FOR MOTOR VEHICLES

BACKGROUND OF THE INVENTION

1. Field of the Invention

The present invention relates to a composite suspension control arm shaft for motor vehicles including two tubular longitudinal control arms connected through a torsion section having a V-shaped or U-shaped cross-section, wherein reinforcing sheet metal pieces are mounted in the transition areas between the torsion section and the longitudinal control arms for increasing the bending stiffness.

2. Description of the Related Art

Composite suspension control arm shafts generally provide the advantages of a simple construction with a low weight per volume and good kinematic properties. The transverse sectional member which connects the two longitudinal control arms acts as a torsion rod, so that a longitudinal control characteristic occurs in the case of simultaneous spring deflection and a triangulated control characteristic occurs in the case of alternating spring deflections.

DE-AS 27 35 939 discloses a composite axle unit for motor vehicles in which two tubular longitudinal control arms are connected to each other in an angular stiff manner through a V-shaped or U-shaped torsion section. The torsion section is constructed of one layer. For increasing the bending stiffness in the transition areas from the torsion section to the longitudinal control arms, corner plates are welded to the torsion section and the longitudinal control arms.

SUMMARY OF THE INVENTION

Therefore, it is the primary object of the present invention to provide a composite suspension control arm shaft which is constructed so as to be flexible with respect to the adaptation to stiffness and track width, wherein the strength behavior is to be improved and the service life is to be increased.

In accordance with the present invention, the ends of the torsion section have a configuration which is adapted to the outer contour of the longitudinal control arms and the apex portions located at the ends extend to the upper sides of the longitudinal control arms, wherein the reinforcing sheet metal pieces are each welded with a leg thereof to the torsion section at the apex portion of the torsion section and with another leg to the length portion of the longitudinal control arm on the side of the wheel carrier, wherein the reinforcing sheet metal pieces are arranged so as to be inclined downwardly from the torsion section toward the end of the longitudinal control arm on the side of the wheel carrier, and wherein the reinforcing sheet metal pieces engage with end faces thereof around portions of a wheel carrier and are connected to the wheel carrier.

Consequently, in the composite suspension control arm shaft according to the present invention, the ends of the torsion section have a configuration which is adapted to the contour of the longitudinal control arm and end with their apex portions at the upper sides of the longitudinal control arms. The ends of the torsion section are then circumferentially welded to the longitudinal control arms. This produces a transition from the torsion section to the longitudinal control arm which can be subjected to high stresses and which is also capable of withstanding permanent loads.

Another significant feature of the present invention is the fact that the reinforcing sheet metal pieces are welded with one leg thereof to the torsion section near the apex, i.e., in the apex portion. The other leg of the reinforcing sheet metal piece is welded to the longitudinal control arm so as to be inclined downwardly starting from the torsion section toward the end on the side of the wheel carrier, wherein the reinforcing sheet metal pieces engage around portions of the wheel carrier at the end face of the reinforcing sheet metal piece and are connected thereto.

The total configuration of the composite suspension control arm shaft makes it possible to achieve section moduli which are adapted to the dynamic loads. The V-shaped or U-shaped cross-section of the torsion sections also contribute to this. The resulting unit of torsion section, longitudinal control arm, wheel carrier and reinforcing sheet metal piece facilitates an efficient transfer of the torsional forces and bending forces from the longitudinal control arms into the torsion section where the forces are compensated. Consequently, the composite suspension control arm shaft according to the present invention has a particularly good static and dynamic load behavior and reaches a long service life.

The adaptation of the stiffness of the composite suspension control arm shaft can be achieved depending on the type of vehicle through a variation of the thickness of the torsion section. An adaptation of the track width to various model series can be realized through a geometric adaptation of the wheel carriers, particularly by the use of differently thick flanges of the wheel carrier or a variation of the flange shape. This can be achieved without problems in the composite suspension control arm shaft according to the present invention. The longitudinal control arms can be manufactured by any conventional technical method, for example, by bending, beating, or hydraulic shaping.

The manufacture of the composite suspension control arm shaft is economical and can be easily automated. The quality of the composite suspension control arm shaft according to the present invention is significantly improved over those of the prior art.

The composite suspension control arm shaft can be manufactured of steel or aluminum or a combination of these two materials.

In accordance with another feature of the present invention, for reducing the weight of the composite suspension control arm shaft, the torsion section and/or the reinforcing sheet metal pieces may be provided with recesses or holes. These recesses or holes are arranged in areas of the structural components which are subjected to low stresses or loads and do not contribute to the stiffness behavior.

In accordance with another feature of the present invention, the wheel carrier includes a frame of U-shaped configuration with triangular side walls. The side walls have recesses adapted to a longitudinal control arm, wherein the wheel carrier engages over the longitudinal control arm with the recesses. On the side facing away from the torsion section, a flange plate is mounted between the side walls, wherein the connection to the wheel suspension is effected through the flange plate.

The shock absorbers are also attached through the wheel carrier.

As a result of the geometric adaptation of the wheel carrier, another adaptation of the track width can be carried out depending on the model series. In this connection, it is possible, for example, to use flange plates having different thicknesses, or the dimensions of the frame may be adapted accordingly.

It is not necessary to change the manufacturing line for the composite suspension control arm shaft when production series are changing. The construction and configuration of the composite suspension control arm shaft remains unchanged. An adaptation of the stiffness is effected by using torsion sections having different thicknesses. The adaptation of the track width is effected by varying the wheel carrier or the frame or flange plates of the wheel carrier.

For improving the attachment of the wheel carrier to the longitudinal control arm, the longitudinal control arms are flattened on the upper sides thereof. In addition, stamped or embossed portions may be provided for stiffening the side walls of a wheel carrier.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a perspective view of a composite suspension control arm shaft for a motor vehicle according to the present invention.

DESCRIPTION OF THE PREFERRED EMBODIMENTS

The drawing partially illustrates a composite suspension control arm shaft for a motor vehicle; specifically, the drawing shows an end portion 1 of a torsion section 2 and a longitudinal control arm 3.

The longitudinal control arm 3 is bending-stiff and torsion-stiff and is manufactured from a pipe and is bent into an S-shape. A wheel carrier 5 is welded to an end 4 of the longitudinal control arm 3. A bearing bushing 7 for connecting the composite suspension control arm shaft to the support frame of a motor vehicle is arranged at the other end 6 of the longitudinal control arm 3. In the connection area 6', the end 6 is bent laterally inwardly to form an approximately rectangular cross-section and the end face thereof is adapted to the upper contour of the bearing bushing 7.

The torsion section 2 has a V-shaped cross-section. The end 8 of the torsion section 2 abutting against the longitudinal control arm 3 has a configuration with is adapted to the outer contour of the longitudinal control arm 3 so that it rests flush against the longitudinal control arm 3 and is welded thereto. The apex area 9 of the torsion section 2 located at the end 8 extends on the same level as the upper side 10 of the longitudinal control arm 3.

The connection between the longitudinal control arms 3 and the torsion section 2 is effected by welding. For increasing the bending stiffness, a reinforcing sheet metal piece 12 is welded into the transition area 11 between the torsion section 2 and the longitudinal control arm 3. The reinforcing sheet metal piece 12 is welded with one leg 13 thereof at the torsion section 2 along the apex area 9 of the torsion section 2 and with the other leg 14 to the longitudinal portion 15 of the longitudinal control arm 3 on the side of the wheel carrier in such a way that, starting from the end 4 of the longitudinal control arm 3 on the side of the wheel carrier, the reinforcing sheet metal piece 12 is inclined downwardly from the torsion section 2.

The leg 13 of the reinforcing sheet metal piece extends at an acute angled to the torsion section 2, so that the local stress distribution is positively influenced in the area of the greatest stiffness jump at the transition from the torsion section 2 to the reinforcing sheet metal piece 12. It is also important that the reinforcing sheet metal piece 12 is attached a short distance below the apex 9'. Consequently, the torsional properties of the torsion section 2 are not influenced negatively and the connecting seam is not subjected to great loads.

The reinforcing sheet metal piece 12 has a semicircular recess 16 in the transition area 11. As a result, a notch effect under the influence of the external load at the transition from the torsion section 2 and the longitudinal control arm 3 can be avoided. Moreover, the recess 16 contributes to an improvement of the surface treatment particularly with respect to the corrosion protection in the welding seam area and for the reduction of weight.

A The reinforcing sheet metal piece 12 engages at the end face thereof over portions of the wheel carrier 5. The reinforcing sheet metal piece 12 is also connected to the wheel carrier 5 by welding.

The wheel carrier 5 includes a frame 17 having a U-shaped configuration with essentially triangular side walls 18, 19. The frame 17 engages with the side walls 18, 19 over the longitudinal control arm 3. For this purpose, recesses 20, 21 adapted to the contour of the longitudinal control arm 3 at the end 4 on the side of the wheel carrier are provided on the side walls 18, 19. On the side 22 of the frame 17 facing away from the torsion section 2, a flange plate 23 is attached between the side walls 18, 19. The flange plate 23 has openings 24 for connecting it to the wheel suspension.

As also illustrated in the drawing, the longitudinal control arm 3 is flattened at the upper and lower sides thereof in the area of connection 25 to the wheel carrier 5. In addition, the side walls 18, 19 of the wheel carrier 5 have stamped or embossed portions 26, 27 for stiffening the side walls. These measures all contribute to a highly stable attachment of the wheel carrier 5 to the end 4 of the longitudinal control arm 3. This attachment is economical and can be effected in a fully automated manner during the manufacturing process of a composite suspension control arm shaft.

On the inner side 28 of the composite suspension control arm shaft, i.e., toward the torsion section 2, the frame 17 of the wheel carrier 5 protrudes to a certain extent, so that a free space 30 remains between the longitudinal control arm 3 and the rear wall 29 of the frame 17. This is where a shock absorber is connected; for this purpose, an eye 31 with an opening 32 is provided at the end 4 of the longitudinal control arm 3 and a opening 33 is provided in the rear wall 29.

The drawing additionally shows that the torsion section 2 as well as the reinforcing sheet metal piece are provided with recesses 34, 35. These recesses or holes also contribute to a weight reduction of the composite suspension control arm shaft.

In the case of different model series, a stiffness adaptation of the composite suspension control arm shaft is effected by an appropriate adaptation of the thickness of the torsion section 2. If a track width adaptation is necessary, this is achieved by an appropriate geometric configuration of the wheel carrier 5, particularly by appropriately changing the dimensions of the frame 17 or of the flange plate 23. In this manner, a manufacture of composite suspension control arm shafts for different types of vehicles is possible without changing the basic concept.

While specific embodiments of the invention have been described in detail to illustrate the inventive principles, it will be understood that the invention may be embodied otherwise without departing from such principles.

We claim:

1. A composite suspension control arm shaft for motor vehicles, the control arm shaft comprising two tubular longitudinal control arms and a torsion section having a V-shaped or U-shaped cross-section connecting the two tubular longitudinal control arms, wherein flat reinforcing sheet metal pieces are mounted in transition areas between the torsion section and the longitudinal control arms for increasing bending stiffness, the torsion section having ends with a configuration matching to an outer contour of the longitudinal control arm and an apex portion located at the end of the torsion section extending to an upper side of the longitudinal control arm, wherein each reinforcing sheet metal piece is welded with a first leg thereof to the torsion section at the apex portion thereof and with a second leg to a length portion of the longitudinal control arm on the side of a wheel carrier, wherein the reinforcing sheet metal piece is mounted so as to be inclined downwardly from the torsion section toward an end of the longitudinal control arm on the side of the wheel carrier, an wherein the reinforcing sheet metal piece engages with an end face thereof around portions of the wheel carrier and is connected to the wheel carrier.

2. The composite suspension control arm shaft according to claim 1, wherein at least one of the torsion section and the reinforcing sheet metal pieces are provided with holes.

3. The composite suspension control arm shaft according to claim 1, wherein the wheel carrier comprises a U-shaped frame with triangular side walls, wherein each side wall has a recess adapted to the longitudinal control arm for engaging around the longitudinal control arm, further comprising a flange plate mounted between the side walls on a side of the wheel carrier facing away from the torsion section.

4. The composite suspension control arm shaft according to claim 1, wherein the longitudinal control arm is flattened at an upper side thereof in a connecting area between the longitudinal control arm and the wheel carrier.

5. The composite suspension control arm shaft according to claim 3, wherein the side walls of the wheel carrier have stiffening stamped or embossed portions.

* * * * *